US007614364B2

(12) United States Patent
van den Berg et al.

(10) Patent No.: US 7,614,364 B2
(45) Date of Patent: Nov. 10, 2009

(54) IMPLEMENT FOR AUTOMATICALLY DETACHING AND DISPLACING AN AMOUNT OF FEED, SUCH AS, FOR EXAMPLE, SILAGE OR HAY

(75) Inventors: Karel van den Berg, Bleskensgraaf (NL); Eliza Niels Voogd, Leerdam (NL); Howard Sie, Rotterdam (NL)

(73) Assignee: Lely Enterprises A.G., Zug (CH)

( * ) Notice: Subject to any disclaimer, the term of this patent is extended or adjusted under 35 U.S.C. 154(b) by 658 days.

(21) Appl. No.: 09/855,535

(22) Filed: May 16, 2001

(65) Prior Publication Data
US 2001/0051084 A1 Dec. 13, 2001

(30) Foreign Application Priority Data
Jun. 9, 2000 (NL) .................................... 1015403

(51) Int. Cl.
*A01K 5/02* (2006.01)
(52) U.S. Cl. ..................... 119/57.92; 119/61.2; 700/247
(58) Field of Classification Search .............. 119/51.01, 119/51.02, 51.12, 51.13, 15.15, 52.1, 54, 119/57, 57.1, 57.2, 57.92, 58, 61, 51.5, 61.1, 119/61.2, 51.11; 900/41; 700/247
See application file for complete search history.

(56) References Cited

U.S. PATENT DOCUMENTS

| | | | | | |
|---|---|---|---|---|---|
| 4,180,136 | A | * | 12/1979 | Jones ........................... | 119/57 |
| 4,337,729 | A | * | 7/1982 | Peppler et al. ............. | 119/57.6 |
| 4,565,485 | A | * | 1/1986 | Wilman ....................... | 37/403 |
| 4,672,917 | A | * | 6/1987 | Fox ............................ | 119/56.1 |
| 4,949,675 | A | * | 8/1990 | Parks ........................ | 119/51.11 |
| 4,981,107 | A | * | 1/1991 | Beaudoin et al. ........... | 119/56.2 |
| 5,069,165 | A | * | 12/1991 | Rousseau ................... | 119/51.02 |
| 5,778,820 | A | * | 7/1998 | van der Lely et al. .... | 119/14.02 |
| 5,816,192 | A | * | 10/1998 | van der Lely et al. .... | 119/57.92 |
| 5,950,562 | A | * | 9/1999 | Schulte et al. ........... | 119/51.02 |
| 5,983,833 | A | * | 11/1999 | van der Lely ............... | 119/436 |
| 2001/0029897 | A1 | * | 10/2001 | Swetzig ................... | 119/51.11 |

FOREIGN PATENT DOCUMENTS

DE        35 10 401 A1 *   9/1986

* cited by examiner

*Primary Examiner*—Rob Swiatek
(74) *Attorney, Agent, or Firm*—Howrey LLP

(57) ABSTRACT

An apparatus which comprises a plurality of containers for animal feed which includes silage, hay, fodder, or a liquid including water or any mixture thereof. The plurality of containers are for different feeds and a plurality of troughs are provided to which feeds from the containers are selectively transferred by robot arms which are computer-controlled based on the identification by an identification sensor of the animal that will next feed at the trough involved. The robot arm may include a gripping element or a bucket or shovel which include closing members. The containers may be disposed above the troughs and a chute may be provided which receives feed from the robot arm which flows through the chute to the trough. The robot arm automatically detaches a portion of the feed from feed stored in one or more of the containers and displaces same either via the chute or directly into the trough. Also the robot arm may move feed from selected containers at one side of the troughs onto a transport vehicle which is movable along a rail to transport feed to a selected trough or troughs.

31 Claims, 3 Drawing Sheets

IMPLEMENT FOR AUTOMATICALLY DETACHING AND DISPLACING AN AMOUNT OF FEED, SUCH AS, FOR EXAMPLE, SILAGE OR HAY

FIELD OF THE INVENTION

The invention relates to an apparatus for automatically detaching and displacing an amount of feed, such as for example silage or hay, from a stock of feed, said apparatus being provided with a robot arm with a detaching member which is suitable for detaching a part of the feed from the stock, displacing it to a predetermined place and depositing it there. Such an apparatus has the advantage that, in a simple manner, a measured out amount of feed, in particular fodder that is difficult to handle, such as silage or hay, can be detached from a stock of feed and be displaced to a predetermined place. In particular in relation to known constructions, in which for example an auger is used, the above-mentioned apparatus has the advantage that with the aid of the robot arm various stocks of feed can simply be reached by the robot arm with the detaching member.

SUMMARY OF THE INVENTION

The detaching member according to the invention comprises a gripping element which has the advantage of being less sensitive to clogging, and has the further advantage of making it possible for example to detach a tuft of hay from a bale of hay.

In a preferred embodiment of the invention, the detaching member comprises a bucket or a shovel. By means of the bucket or the shovel it is in particular possible to detach in a simple manner blocks of concentrate from a stock of feed.

According to another inventive feature, the detaching member is capable of being closed. Especially when granular or pulverulent material has to be detached from a stock of feed, it is of importance that the detaching member can be closed for the purpose of preventing loss of feed during transport.

In order to prevent the detaching member from being contaminated, the robot arm is provided with cleaning or brushing means, or both, for the detaching member. In a preferred embodiment of the invention, the cleaning or brushing means, or both, comprise a sweeping element. For the purpose of being able to detach from the stock a previously measured out portion of feed, the apparatus comprises metering means.

According to again another inventive feature, the apparatus comprises weighing means for weighing said portion of feed. According to a further inventive feature, the robot arm comprises the weighing means. In order to be able to determine where and when a particular amount of feed can be deposited by the robot arm with the detaching member, the apparatus comprises animal identification means, with the aid of which an animal can be identified. According to a further inventive feature, the animal identification means are fitted on the robot arm. This has the advantage that, for example in the situation that a feeding column with various feeding troughs is used, it is not necessary to provide each feeding trough with animal identification means.

According to a further inventive feature, the apparatus comprises at least one trough for feeding or watering, or both. According to another inventive feature, the apparatus comprises at least one container for storing the fodder or drink, or both. In a preferred embodiment of the invention, the robot arm is disposed above the trough which is for feeding or watering, or both, and above the container. According to again another inventive feature, the apparatus is provided with a chute via which the feed can be discharged to a relevant feeding or watering trough, or both. In an embodiment of the invention, the robot arm has such dimensions that the detaching member can move over or along the bottom of the container or the feeding or watering trough or any combination thereof. Thus it is possible to take the last remnants of feed from the container or the trough. In order to be able also to use the robot arm for example in a loose house, the robot arm is at least movable over the floor of the stable. In a preferred embodiment of the invention, the robot arm is movable along a rail. It will be obvious that it is also possible to dispose the robot arm for example on belts, such as caterpillar tracks, and to move it in this manner through the stable. According to again another embodiment of the invention, the apparatus comprises one or more transport vehicles that co-operate with the robot arm. Thus it is possible, for example in a stable, to convey by means of the transport vehicles the feed that has been detached to a particular place and to deposit it there. In a preferred embodiment of the invention the transport vehicles are movable along a rail. The above-mentioned apparatus can in particular be applied in a feeding column with various feeding or watering troughs, or both, to which the animals are allowed to go.

BRIEF DESCRIPTION OF THE DRAWINGS

The invention will now be explained in further detail with reference to the accompanying drawings, in which.

DESCRIPTION OF THE PREFERRED EMBODIMENTS

Figure 1:
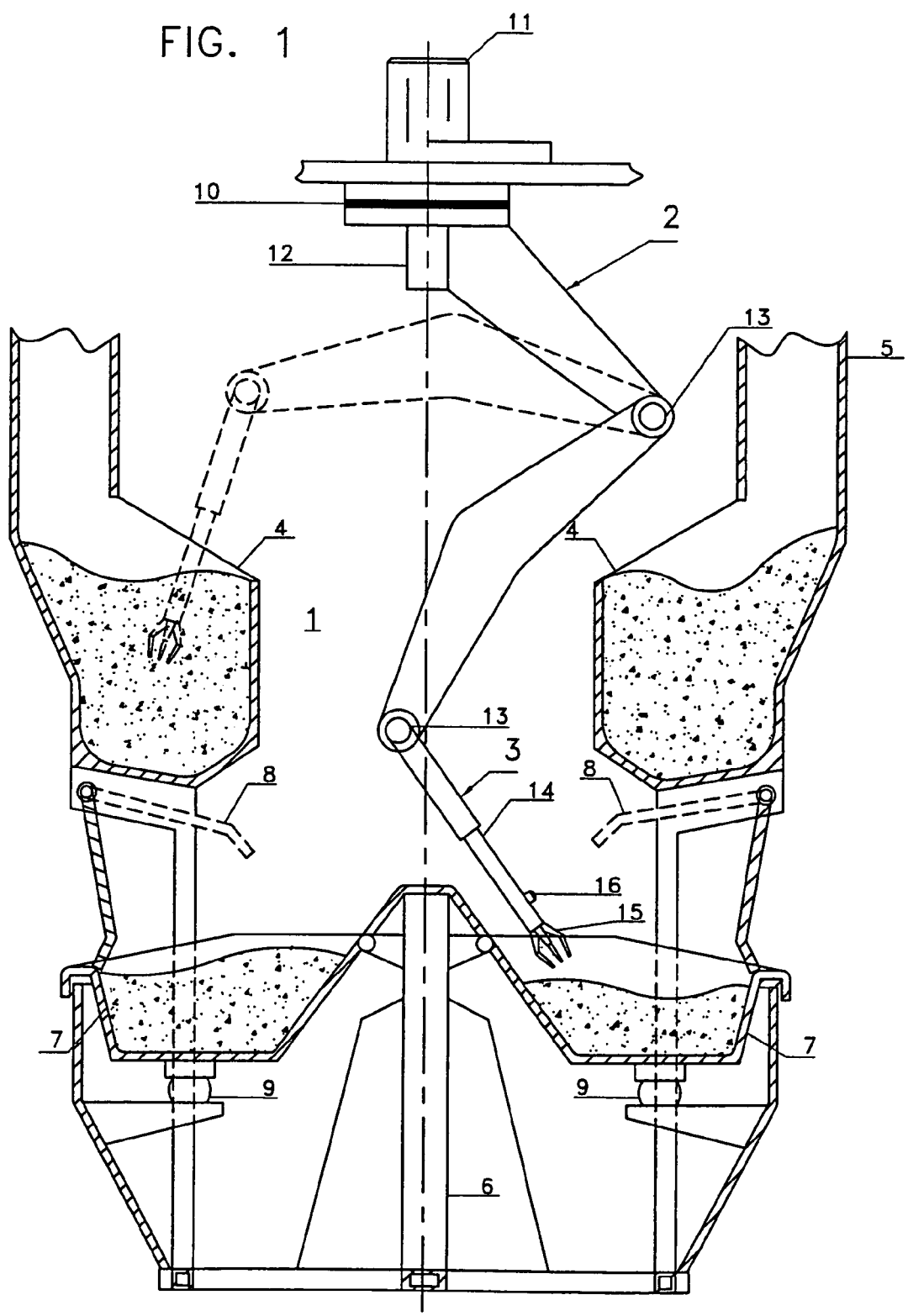
FIG. 1 is an elevational cross-sectional view of an apparatus according to the invention.

FIG. 1 is a cross-section of an apparatus 1 for automatically detaching and displacing an amount of feed. Apparatus 1 is provided with a robot arm 2 with a detaching member 3 which is suitable for detaching feed from containers 4 that are integrated in a feeding column 5. Feeding column 5 comprises troughs 7 for feeding or watering, or both, that are disposed around a central axle 6 and from which animals, such as cows for example, can eat or drink, or both. Each feeding trough 7 is capable of being closed separately by means of a closing member 8 which is a lid in the present embodiment. Under each feeding trough 7 is disposed a load cell 9 with the aid of which the weight of a relevant feeding trough can be determined. As shown in FIG. 1, the robot arm is arranged centrally above containers 4. This measure has the advantage that robot arm 2 with detaching member 3 can reach in a simple manner all containers 4, as well as feeding troughs 7. Robot arm 2 is also provided with a weighing device 10 which is designed as a load cell in the present embodiment. By means of weighing device 10 it is possible to determine each time how much feed is taken from a container 4 and deposited in a particular feeding trough 7. Robot arm 2 is further provided with a first stepper motor 11 with the aid of which robot arm 2 can be rotated about a vertical axle 12. Robot arm 2 is further provided with two further stepper motors 13 with the aid of which robot 2 arm can be positioned in the vertical plane. The end of robot arm 2 comprises a telescopic piston and cylinder unit 14. In the present embodiment detaching member 3 is designed as a gripper 15 with the aid of which feed can be seized and be released. Near detaching member 3 there is further disposed an animal identification system 16 which makes it possible to recognize an animal that is standing near one of troughs 7. By means of the animal identification system 16 and a computer it can thus be determined whether or not an animal that is waiting near a feeding trough 7 will be fed. Upon feeding the animals it is possible to compose a meal of feed from various containers 4 for a relevant animal. The gripper is particularly appropriate when roughage, such as for example silage or hay, has to be taken from a container 4. It will be obvious that it is also possible, of course, when remnants of feed are still present in feeding troughs 7 after a particular animal has eaten there, to take these remnants back by means of robot arm 2, and to displace them to a relevant container 4 and deposit them there.

Figure 2:
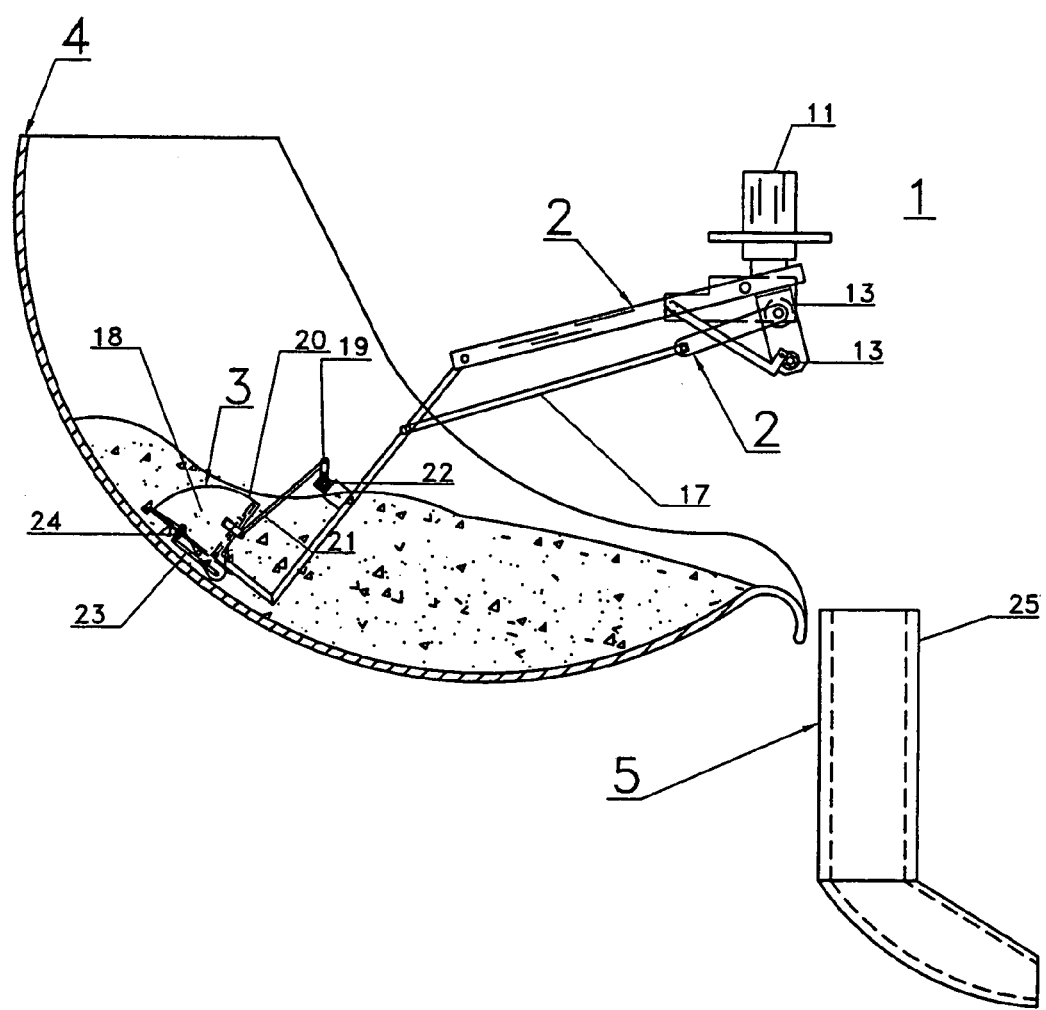
FIG. 2 is a second embodiment of an apparatus according to the invention.

FIG. 2 shows a second embodiment of an apparatus 1 for automatically detaching and displacing an amount of feed from a container 4 of a feeding column 5 which is not completely depicted in FIG. 2. In the present embodiment robot arm 2 is differently designed than robot arm 2 according to FIG. 1. However, corresponding parts are indicated by the same reference numerals. By means of upper stepper motor 13 it is possible to move detaching member 3 along the curved lines of container 4, while the lower stepper motor 13 makes it possible to move the entire robot arm 2 upwardly or downwardly. To allow the latter movements, robot arm 2 comprises a quadrangular pivot construction 17. In the present embodiment detaching member 3 comprises a bucket 18 which is disposed at the end of robot arm 2. With the aid of bucket 18 feed can be scooped from container 4. By means of a closing mechanism 19 it is possible to close bucket 18 after the latter has been filled completely, so that feed is prevented from falling from the bucket during transport. For that purpose closing mechanism 19 comprises a closing lid 20 which is connected by means of a steering rod 21 to a stepper motor 22 which, after having been energized, causes bucket 18 to be closed or opened. Closing mechanism 19 is further coupled with cleaning means 23 that is moved along the bottom or along the walls of bucket 18 or both during opening or closing or both of said bucket 18. For that purpose cleaning means 23 comprise a brushing element 24. When bucket 18 has been filled completely, said bucket 18 is moved by means of robot arm 2 to a chute 25 where the feed is poured into chute 25 by activating closing mechanism 19. Via chute 25 the feed is poured into a predetermined feeding trough, such as feeding trough 7 in FIG. 1. By means of torque measurements on the stepper motors 11 or 13, or both, it is possible to determine whether the bucket is fill or empty while removing feed from containers 4. Apparatus according to FIG. 2 can be completely integrated into feeding column 5 as shown in FIG. 1.

Figure 3:
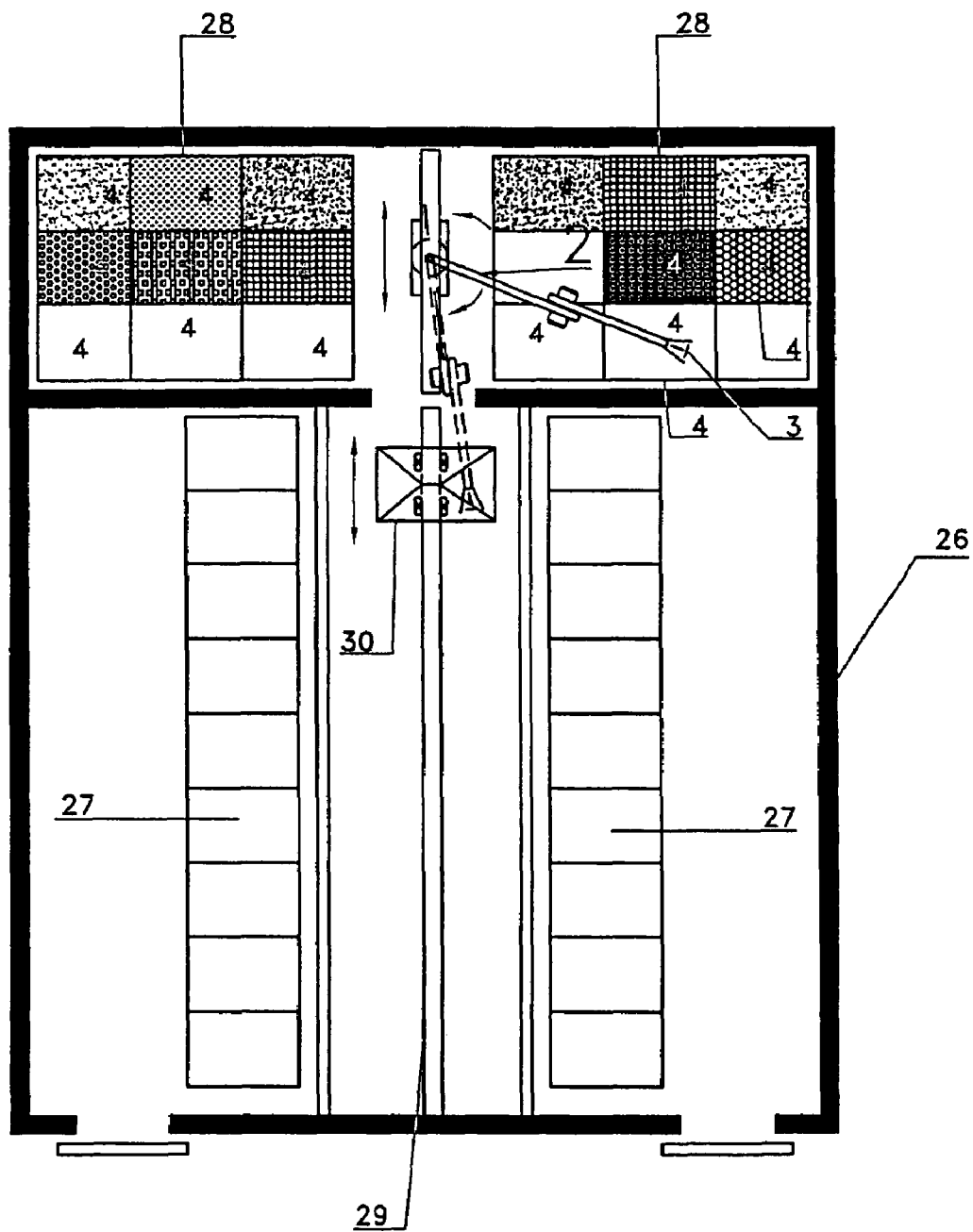
FIG. 3 is a plan view of a loose house in which a third embodiment of an apparatus according to the invention is depicted.

FIG. 3 is a plan view of a stable 26 with a third embodiment of an apparatus 1 according to the invention arranged therein. Stable 26 comprises two rows of feed stands of cubicles 27 and at the end thereof two storage areas 28 for storing roughage or concentrate, or both. Storage areas 28 each comprise a plurality of containers 4 for storing various categories of fodder or drink, or both. A rail 29 is disposed between the two rows of feed stands 27 and storage areas 28 along which a transport vehicle 30 moves automatically under computer-control. By means of robot arm 2, feed can be deposited from a container 4 into transport vehicle 30 by means of detaching member 3. Robot arm 2 of apparatus 1 in FIG. 1 may be designed as the robot arm in FIG. 1 or FIG. 2. Robot arm 2 is also automatically movable under computer-control along the rail 29. With the aid of animal identification means it is thus possible to convey feed to a predetermined feed stand of a cubicle 27 by means of robot arm 2 and transport vehicle 30. It is also possible to arrange a stationary robot arm 2 between storage areas 28 and to convey feed to a particular place only by means of transport vehicle 30.

Although we have disclosed the preferred embodiments of our invention, it is to be understood that it is capable of other adaptations and modifications within the scope of the following claims:

Having disclosed our invention, what we claim as new and to be secured by Letters Patent of the United States of America is:

1. An apparatus for automatically detaching and displacing feed for animals which comprises a plurality of stationary storage containers for said animals' feed, a plurality of stationary animal feed stands for receiving said feed from said containers, said animal feed containers and said animal feed stands being integrated in a stationary structure, each said animal stand accommodating an animal to consume said animal feed, a robot arm which is constructed and arranged to move said animal feed from a selected container to a selected animal feed stand, said robot arm comprising detaching means for detaching part of said animal feed in said selected container and displacing means for displacing a so detached part of said animal feed to said selected feed stand and depositing it there.

2. An apparatus in accordance with claim 1, wherein said feed stands comprise feed troughs.

3. An apparatus in accordance with claim 1, wherein said detaching means comprises a telescopic gripping element.

4. An apparatus in accordance with claim 1, wherein said detaching means comprises a bucket.

5. An apparatus in accordance with claim 1, wherein said detaching means comprises a shovel.

6. An apparatus in accordance with claim 1, wherein said detaching means comprises closure means.

7. An apparatus in accordance with claim 1, wherein said robot arm comprises cleaning means for cleaning said detaching means.

8. An apparatus in accordance with claim 7, wherein said cleaning means comprises a sweeping element.

9. An apparatus in accordance with claim 1, wherein said robot arm comprises brushing means for brushing substances from said detaching means.

10. An apparatus in accordance with claim 9, wherein said brushing means comprises a sweeping element.

11. An apparatus in accordance with claim 1, which comprises metering means which provides that said part of said animal feed comprises a pre-measured-out portion of said animal feed which is detached by said detaching means.

12. An apparatus in accordance with claim 1, which comprises weighing means for weighing said part of said animal feed which has been detached by said detaching means.

13. An apparatus in accordance with claim 1, wherein said robot arm comprises weighing means for weighing said part of said animal feed detached by said detaching means.

14. An apparatus in accordance with claim 1, comprising animal identification means for identifying an animal in the immediate vicinity of said feed stand for the purpose of consuming said animal feed received therein.

15. An apparatus in accordance with claim 14, wherein said animal identification means is mounted on said robot arm.

16. An apparatus in accordance with claim 1, in which said animal feed consists essentially of at least one of the following components: solid composites, a concentrate, silage, hay, fodder, a liquid including water, or any mixture of the foregoing.

17. An apparatus in accordance with claim 16, wherein each said container contains a said component which is different from said components in the other said containers.

18. An apparatus in accordance with claim 1, wherein said robot arm is disposed above said animals' feed stands.

19. An apparatus in accordance with claim 1, wherein said robot arm is disposed between said containers.

20. An apparatus in accordance with claim 1, wherein said robot arm is disposed above said animal feed stands and said containers.

21. An apparatus in accordance with claim 1, which comprises a chute via which said animal feed can be discharged to said animal feed stands.

22. An apparatus in accordance with claim 1, wherein said detaching means performs at least one function consisting of the following functions: the function of moving above the bottom of said containers, or the function of moving along the bottom of said containers, or the function of moving into each of said animal feed stands, or any combination of said functions.

23. An apparatus in accordance with claim 1, which is supported on a floor, said robot arm being movable above said floor.

24. An apparatus in accordance with claim 23, which comprises a rail which is disposed over said floor, said robot arm being movable along said rail.

25. An apparatus in accordance with claim 24, wherein each of said feed stands comprises a trough.

26. An apparatus in accordance with claim 25, wherein each said trough is disposed below at least one of said containers.

27. An apparatus in accordance with claim 26, wherein each said trough and each said container are positioned in close proximity and disposed in a common vertical plane said robot arm detaching feed from a selected said container and placing said feed into a selected trough directly and rapidly while continuously in said plane.

28. An apparatus in accordance with claim 1, which comprises a transport vehicle, which is movable between said containers and said animal feed stands, said transport vehicle cooperating with said robot arm.

29. An apparatus in accordance with claim 28, which comprises a rail, said transport vehicle movable along said rail.

30. An apparatus for automatically detaching and displacing animal consumables for consumption by animals which comprises a plurality of storage containers, said containers holding different animal consumables, a plurality of troughs disposed below said containers for receiving said animal consumables from said containers, an articulated robot arm which is constructed and arranged to move said animal consumables from a selected one of said containers to a selected one of said troughs, said robot arm comprising detaching means for detaching a predetermined portion of a said animal consumable from one of said animal consumables in said one container and displacing means for selectively displacing said portion of said animal consumable to said selected trough and depositing said portion therein, said detaching means consisting essentially of a gripping element or a bucket or a shovel.

31. An apparatus for automatically detaching and displacing animal consumables for consumption by animals which comprises a feed station having a plurality of containers, said containers holding different animal consumables, a plurality of troughs in said station for receiving selected said animal consumables from selected said containers, a bendable robot arm which is constructed and arranged to move said animal feed from a selected said one of said containers to said selected one of said troughs, said robot arm comprising detaching means for obtaining a predetermined amount of an animal consumable from a said animal consumable in one of said containers and displacing means for selectively displacing said detached amount of an animal consumable into said selected trough of said troughs.

* * * * *

UNITED STATES PATENT AND TRADEMARK OFFICE
CERTIFICATE OF CORRECTION

| | | |
|---|---|---|
| PATENT NO. | : 7,614,364 B2 | Page 1 of 1 |
| APPLICATION NO. | : 09/855535 | |
| DATED | : November 10, 2009 | |
| INVENTOR(S) | : van den Berg et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 546 days.

Signed and Sealed this

Nineteenth Day of October, 2010

David J. Kappos
*Director of the United States Patent and Trademark Office*